Figure 1:
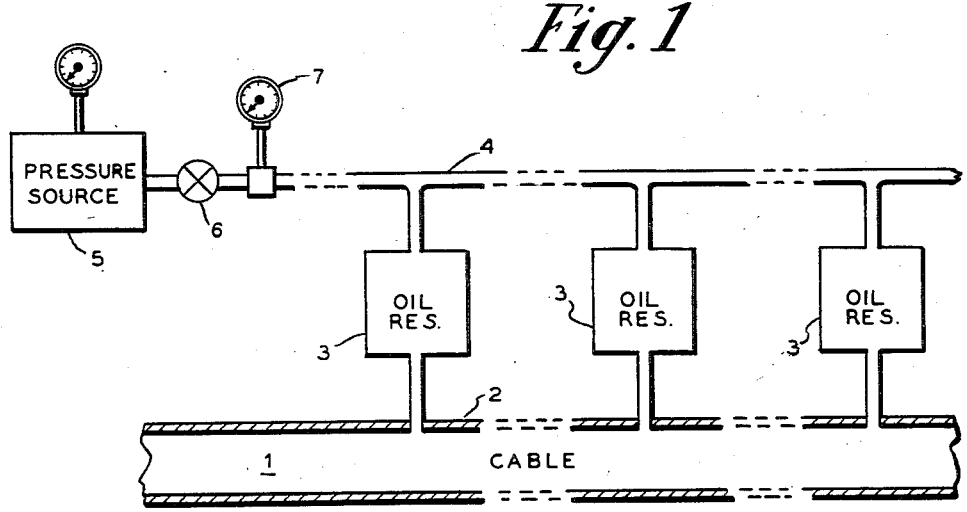

United States Patent Office 2,827,404
Patented Mar. 18, 1958

2,827,404

ELASTIC SHEATH CABLES

Nicholas Klein, Haifa, Israel, assignor of one-half to The American Society for the Advancement of The Hebrew Institute of Technology in Haifa, Palestine, Inc., New York, N. Y., a corporation of New York Application February 10, 1956, Serial No. 564,798

16 Claims. (Cl. 148—4)

The present invention relates generally to the manufacture, transportation and laying of electric cables, and more particularly concerns electric cables having elastic sheaths subjected to internal pressures.

It is well known in the art relating to electric cables, to fabricate elastic sheath cables, operating under internal pressures. These cables normally utilize solid and liquid insulation materials, and gas filled cavities are carefully avoided. The sheath cross-sections are normally non-circular, elliptical and triangular shapes being common, and a minimum internal pressure is maintained at no load. As load is applied the temperature of such cables increases, with consequent increase of internal pressure. The sheath distorts, in response to this increase in internal pressure, in such manner as to increase the volume of the cable, i. e. in the case of a cable of non-circular cross-section, the cross-section becomes more nearly circular under load than it had been under no load.

The continued operativeness of the cable, and its safe functioning, requires that all deformations be reversible, i. e. that the cable and particularly the sheath return to its original shape when the internal pressure is decreased on no load. This condition is met if the greatest strain introduced on full cable load remains below the elastic limit for the cable and particularly for the sheath material.

It follows that the current carrying capacity of an elastic sheath cable is a direct function of the permissible temperature increase of the cable under load. The latter is proportional to permissbile volume increase, which in turn depends on the elastic limit of the sheath metal.

The elastic limit of various metals, in the pure, soft state, is found to be less than 0.0005. Calculations show values of 0.0015 to be desirable. Such values of elastic limit are found only in metals which have been in some degree hardened. It follows that materials suitable for elastic sheath cables must be harder by a considerable factor than materials employed for sheathing ordinary cables. The latter being soft, can be readily transported on drums, unwound, and layed. Pressure cable, having hard elastic sheathing, cannot be transported in drums to a desired location, unwound, and layed.

It is the primary object of the present invention to provide a novel method of fabrication, transportation and laying of elastic sheath pressure cables.

It is a further object of the invention to provide a method of sheathed cable fabrication, transportation and laying, while soft, followed by sheath hardening treatment after the cable has been laid, and while in situ.

It is another object of my invention to produce a hardened sheath in a sheathed cable, after the cable has been laid.

Figure 2:
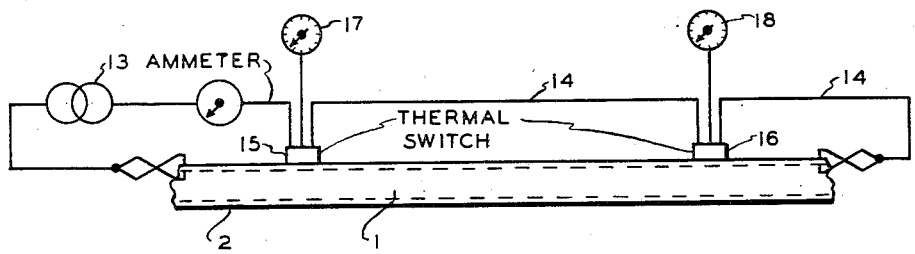

The above and still further features, objects, and advantages of the invention will become apparent upon consideration of the following detailed description of a specific embodiment of the invention, especially when taken in conjunction with the accompanying drawings, wherein:

Figure 1 is a functional diagram of a system for work hardening cable sheaths, in situ; and Figure 2 is a functional diagram of a system for heat hardening cable sheaths, in situ.

Briefly describing now the present invention, a cable is sheathed, in a factory, by any desired method, with a metallic sheath, the metal being capable of hardening. The cable is then transported, on drums or otherwise, and laid, while the sheath is unhardened. After the cable has been laid it is subjected to repeated internal variations of pressure, or to temperature variations, sufficient to cause hardening; the procedure being repeated, as necessary, until the desired elastic limit has been attained for the sheath.

In the alternative the hardening may be partially accomplished by swaging in situ and completed by repeated pressure variations or by heating.

If desired the cable may be lead sheathed at the factory, and the lead may be removed and the final sheath material substituted after the cable has been laid. This obviates the possibility that the final elastic sheath material will be subjected to age hardening, or to inadvertent hardening, before being laid.

WORK HARDENING

In the case of metals hardenable by work hardening, the cable, as 1, is sheathed at the factory with a metal sheath 2, of suitable thickness, while the metal is in its soft, annealed state, utilizing any known method of fabrication. The cable is transported to the laying site, on drums or the like, and laid. The sheath may be oversize at this point in the procedure, in which case it may be swaged down in situ, causing partial work hardening; or the sheath may be originally of suitable size. Further, if desired the cable may be lead sheathed preliminarily at the factory, and after laying the lead sheath may be removed and the final sheath applied.

Assume the sheath 2 to be fabricated of aluminum alloy 54S containing 3½% Mg and ⅓% Mn, for example only. The elastic limit is, for this metal, 7000 lb./sq. in. To the cable is connected during work hardening a plurality of oil reservoirs 3, at suitable lengths therealong, which serve to keep the cable 1 filled with oil. To the oil reservoirs 3 is connected a pressure line 4, filled with oil, and connected to a pressure source 5 and a control valve 6, which permits application of any desired degree of pressure to the line 4, and thence to the oil reservoirs 3, and the interior of the cable 1. The latter is of course, closed at its ends, and together with the required joints constitutes a closed system. The pressure applied from source 5 may be measured, as by a meter 7, and if desired, meters may be employed in conjunction with the oil reservoirs 3. In any event, pressure is propagated rapidly along the cable, because low viscosity oil is employed, and the oil paths in the cable and in the pipe line 4 are relatively large.

The largest stresses produced in sheath 2 during cyclic application of pressures, always exceed the elastic limit of the sheath by about 10%. So, the first pressure may be about 7700 lb./sq. in., and each succeeding cycle of pressure may represent a further increase of 10%, until a final pressure 17,500 lb./sq. in. has been attained, and this pressure should be applied five or ten times in succession. A desirable strain limit is 0.0015 as hereinbefore stated, which corresponds with a stress of 15,000 lb./sq. in. The quoted value is safely in excess of that required.

The cycles of pressure should follow each other as quickly as possible, the required delays between successive applications of pressure being only those required for propagation of pressure variations through the system.

The system of work hardening described immediately above may be applied, making allowance for difference of elastic limits, to aluminum 56S, to commercially pure aluminum, and to various hardenable alloys of aluminum. Alloys of copper, such as brasses, bronzes, copper-nickel alloys, Monel, and pure copper, are also suitable. Iron alloys, preferably of the non-magnetic type, and containing high percentages of chrominum and nickel may also be employed.

HEAT HARDENING

Certain metals which are suitable for cable sheaths are susceptible of hardening by heat treatment. The cable may be laid in soft state, and hardened in situ by heat treatment until the required elastic limit has been attained. In this procedure care must be taken not to reach temperatures at which cable insulation will be damaged. This limitation requires that temperatures not to exceed 120° C. be employed, and in consequence the procedure requires several hours to complete. Heat may be applied to the cable by causing electric current to flow directly in the sheath or in metal tape wound about the sheath.

A specific example of heat hardening is described for elastic sheath cables, employing aluminum alloy 26S as a sheath metal. This alloy contains 4% Cu, ¾% Si, ¾% Mn, and ½% Mg.

Referring now more particularly to Figure 2 of the accompanying drawings, there is illustrated a cable 1, having a heat hardenable sheath 2. A source of electric current 13 such as a generator, causes current of measured amount to flow directly in the sheath 2, the return path for the current being a line 14. In series with the line 14, at several points therealong, are thermally responsive circuit breakers 15, 16, which trip when the cable sheath 2 attains a predetermined temperature. In essence then, the circuit breakers 15, 16 are thermostatic switches, normally closed, and which open when sufficiently heated. Such switches are, per se, well known and commercially available, and may be placed in contact with sheath 2 at several positions therealong, to assure that no hot spots will develop in the cable, and damage same.

The switches 15, 16 . . . may be equipped with indicators of temperature, as 17, 18, so that current in the cable may be controlled, as desirable, to maintain required temperatures, and heating cycles of from 2 to 10 hours may be required.

The above described heat hardening treatment may be applied to sheaths fabricated of a large variety of age-hardenable alloys of aluminum, copper and iron, and more specific mention may be made of alloys containing beryllium, nickel and silicon, nickel and aluminum, aluminum bronzes.

In the following table are provided data concerning representative alloys, preferred methods of hardening in situ, and certain pertinent physical factors.

Table I

| A. Alloys for work hardening | Proportionality limit in lb./sq. in. | | Stress in lb./sq. in., when strain =0.0015 |
|---|---|---|---|
| | soft | hard | |
| Aluminum 54S—Mg 3½%, Mn ⅛% | 7,000 | | 15,000 |
| Aluminum 56S—Mg 5%, Mn ⅛% | 15,000 | | 15,000 |
| High conductivity copper | 2,000 | 27,000 | 24,000 |
| Brass—65% Cu, 35% Zn | 9,000 | 40,000 | 21,000 |
| Aluminum brass—76% Cu, 22% Zn, 2% Al | 9,000 | 36,000 | 22,000 |
| Aluminum bronze—92% Cu, 5% Al, 3% Mn and Ni | 9,000 | 45,000 | 24,000 |
| Copper-Nickel—80% Cu, 20% Ni | 9,000 | 40,000 | 29,000 |
| Monel | 22,000 | 55,000 | 38,000 |
| Austenitic steel—18% Cr, 8% Ni | 16,000 | roughly 29,000 corresponding to a strain of 0.0011 | |

Table I.—Continued

| B. Alloys for heat treatment | Proportionality limit in lb./sq. in. after full heat treatment | Stress in lb./sq. in. when strain =0.0015 |
|---|---|---|
| Aluminum 26S—Cu 4%, Si ¾%, Mn ¾% | 40,000 | 15,000 |
| Aluminum 75S—Zn 6%, Mg 2½%, Cu ⅛%, Mn ¼%, Cr ⅛% | 50,000 | 15,000 |
| Beryllium Copper—1.75 to 2.5% Be, some Co, Ni, etc | 90,000 | 24,000 |
| Silicon Bronze—91.5% Cu, 4% Si, 2% Fe, 2% Zn | 50,000 | 24,000 |
| Special brass—72.5% Cu, 20% Zn, 6% Ni, 1.5% Al | 45,000 | 23,000 |

While I have described specific and preferred embodiments of my invention, as required by the applicable statutes of the United States, modification of general arrangement, and of detail may be resorted to without departing from the true spirit of the invention, as defined in the appended claims.

What I claim is:

1. A method of fabricating, transporting and laying sheathed pressure cable comprising the steps of: (1) fabricating, transporting and laying a sheathed pressure cable, the laid cable having a relatively soft but hardenable metallic sheath; (2) hardening said metallic sheath in situ.

2. The method in accordance with claim 1 wherein said hardening is heat hardening.

3. The method in accordance with claim 1 wherein said hardening is work hardening.

4. A method of cable making, said cable being pressurized internally and having a metallic sheath, comprising the steps of: (1) establishing said cable in situ, said cable when so established having a relatively soft sheath, and (2) hardening said sheath in situ by repeated applications of internal pressure exceeding the elastic limit of said cable by a factor of the order of about 10% in each of a plurality of applications until the elastic limit of said sheath exceeds a predetermined value.

5. The method of cable making, said cable being pressurized internally and having a metallic heat hardenable sheath, comprising the steps of: (1) establishing said cable in situ, said cable when so established having a relatively soft sheath, (2) hardening said sheath in situ by application of heat to said sheath until a predetermined elastic limit has been attained.

6. The method of cable making and laying, said cable having a sheath of deformable metal of fabricated non-circular cross-section, the steps of: (1) establishing said cable in situ while said sheath is in relatively soft and pliable state, (2) hardening said sheath in situ until the elastic limit of said sheath is of the order of .001 to .0025 according to need.

7. The combination in accordance with claim 6 wherein said hardening is accomplished by heat hardening for a period of approximately from 2-10 hours, at a temperature of not greater than 120° centigrade.

8. The combination in accordance with claim 6 wherein said hardening is accomplished by work hardening, said work hardening included repeated applications and releases of pressure internally of said cable, said applications of pressure stressing said sheath at least slightly above its elastic limits, as said limits increase due to applications of said pressure.

9. A method of cable making and laying, said cable being pressurized internally and having a metallic non-ferrous sheath, comprising the steps of: (1) establishing said cable in situ while said sheath is soft and pliable, and (2) hardening said sheath in situ.

10. The combination according to claim 9 wherein said metallic non-ferrous sheath is fabricated of an alloy.

11. The combination according to claim 10 wherein said alloy includes primarily aluminum.

12. The combination according to claim 10 wherein said alloy includes primarily copper.

13. A method of cable making and laying, said cable being pressurized internally and having a metallic sheath, comprising the steps of: (1) establishing said cable in situ while said sheath has an elastic limit of the order of 0.0005, and (2) hardening said sheath in situ sufficiently to establish an elastic limit for said sheath of the order of 0.0015.

14. The combination according to claim 13 wherein said hardening is accomplished by the application of heat.

15. The combination according to claim 14 wherein said heat is not greater than 120° centigrade, and is applied for a period of from two to ten hours.

16. The combination according to claim 15 wherein said heat is applied by conversion of electrical energy into said heat.

References Cited in the file of this patent

UNITED STATES PATENTS

| | | |
|---|---|---|
| 1,395,474 | Bray | Nov. 1, 1921 |
| 1,834,128 | Langerberg | Dec. 1, 1931 |
| 1,891,234 | Langerberg | Dec. 26, 1932 |
| 1,926,545 | Koch | Sept. 12, 1933 |
| 2,044,763 | Bouton et al. | June 23, 1936 |
| 2,197,609 | Cornell | Apr. 16, 1940 |
| 2,615,411 | Clevenger et al. | Oct. 28, 1952 |